United States Patent
Lin et al.

(10) Patent No.: US 10,167,916 B2
(45) Date of Patent: Jan. 1, 2019

(54) BRAKE PAD WEAR SENSOR

(71) Applicant: TRW AUTOMOTIVE U.S. LLC, Livonia, MI (US)

(72) Inventors: Xing Ping Lin, West Bloomfield, MI (US); Mark Baker, Brighton, MI (US)

(73) Assignee: TRW Automotive U.S. LLC, Livonia, MI (US)

(*) Notice: Subject to any disclaimer, the term of this patent is extended or adjusted under 35 U.S.C. 154(b) by 0 days.

(21) Appl. No.: 15/664,096

(22) Filed: Jul. 31, 2017

(65) Prior Publication Data

US 2018/0031066 A1    Feb. 1, 2018

Related U.S. Application Data

(60) Provisional application No. 62/368,206, filed on Jul. 29, 2016, provisional application No. 62/368,204, filed on Jul. 29, 2016, provisional application No. 62/368,200, filed on Jul. 29, 2016.

(51) Int. Cl.
*F16D 66/02* (2006.01)

(52) U.S. Cl.
CPC ......... *F16D 66/024* (2013.01); *F16D 66/021* (2013.01); *F16D 66/027* (2013.01); *F16D 66/028* (2013.01); *B60Y 2410/111* (2013.01)

(58) Field of Classification Search
CPC ..... F16D 66/024; F16D 66/028; F16D 66/021
USPC ........................................................ 340/454
See application file for complete search history.

(56) References Cited

U.S. PATENT DOCUMENTS

| | | | |
|---|---|---|---|
| 5,833,033 | A | 11/1998 | Takanashi |
| 6,257,374 | B1 | 7/2001 | Strzelczyk et al. |
| 2006/0042734 | A1 | 3/2006 | Turner et al. |
| 2016/0146279 | A1 | 5/2016 | Philpott |

FOREIGN PATENT DOCUMENTS

EP    0754875 A1    1/1997

*Primary Examiner* — John A Tweel, Jr.
(74) *Attorney, Agent, or Firm* — Tarolli, Sundheim, Covell & Tummino LLP

(57) ABSTRACT

A brake pad wear sensing system for measuring brake pad wear for a vehicle disc brake system includes an RF communication circuit for transmitting an RF signal including brake pad wear data. The system also includes a vehicle-based receiver including an RF communication circuit for receiving the brake pad wear data in the RF signal transmitted by the wear sensor. The vehicle-based receiver is operatively connected to a vehicle-based main controller. The vehicle-based receiver transmits the brake pad wear data to the main controller.

12 Claims, 9 Drawing Sheets

BRAKE PAD WEAR SENSOR

RELATED APPLICATION

This application claims the benefit of U.S. Provisional Application Ser. No. 62/368,206, filed on Jul. 29, 2016, U.S. Provisional Application Ser. No. 62/368,204, filed on Jul. 29, 2016, and U.S. Provisional Application Ser. No. 62/368,200, filed on Jul. 29, 2016. The disclosures in these applications are hereby incorporated herein by reference in their entireties.

TECHNICAL FIELD

The invention relates generally to brake pad wear sensing systems and devices. More particularly, the invention relates to a brake pad wear sensor that measures wear in both inner and outer brake pads of a disc braking system.

BACKGROUND

It is desirable to sense and inform the driver when automotive brake pads need to be replaced. Known electronic brake wear sensors have a resistor circuit sensor that is cupped to the inner brake pad. As the pad is abraded away by the rotor, the sensor is also abraded away, changing its resistance. A pigtail harness is connected to the sensor which is wired to a sensing module in the vehicle.

There are several problems with the known approach. The multiple wire harnesses required and the additional sensing module makes this an expensive solution. Routing of the harnesses through the vehicle suspension and the wheel/steering knuckle area is very challenging and prone to road debris abuse. Additionally, the wear sensor has to be replaced each time the pads are replaced, which can be expensive.

While employing electronic sensors to detect brake pad wear, it is important to consider that the brake pad and brake caliper area can reach temperatures in excess of 300 degrees C., which many electronic sensors cannot withstand.

From a cost and implementation standpoint, it is desirable to not use any wire harness and to try to utilize existing product already on the vehicle to reduce the cost of transporting the pad wear information to the driver display. It is also desirable that it not be necessary to replace the brake pad wear sensor with the brake pads when they are replaced. It is also desirable that the brake pad wear sensor provides diagnostic (e.g., heartbeat) capabilities, and the sensor must be capable of withstanding the extreme temperatures seen during braking.

SUMMARY

A brake pad wear sensing system for measuring brake pad wear for a vehicle disc brake system includes an RF communication circuit for transmitting an RF signal including brake pad wear data. The system also includes a vehicle-based receiver including an RF communication circuit for receiving the brake pad wear data in the RF signal transmitted by the wear sensor. The vehicle-based receiver is operatively connected to a vehicle-based main controller. The vehicle-based receiver transmits the brake pad wear data to the main controller.

According to one aspect, the vehicle-based main controller can include one of a remote keyless entry (RKE) system controller, a passive keyless entry (PKE) system controller, and a tire pressure monitoring (TPM) system controller.

According to another aspect, alone or in combination with any previous aspect, the vehicle-based receiver can include a tire pressure monitoring (TPM) system controller. The base unit can transmit the RF signal to a tire-mounted TPM sensor. The TPM sensor can transmit a signal including the brake pad wear data to the main controller.

According to another aspect, alone or in combination with any previous aspect, the base unit can include an RFID circuit and the vehicle based receiver comprises an RFID controller.

According to another aspect, alone or in combination with any previous aspect, the RFID controller can include a passive keyless entry (PKE) controller that issues a low frequency (LF) interrogation signal to the RFID circuit. The RFID circuit can transmit a radio frequency (RF) signal to the PKE controller. The RF signal can include the brake pad wear data.

According to another aspect, alone or in combination with any previous aspect, the system can include a diagnostic tool operative to interrogate the RFID circuit to perform diagnostic functions on the RFID circuit.

According to another aspect, alone or in combination with any previous aspect, the vehicle-based receiver can include an RFID controller. The base unit can include a low frequency (LF) receiver. The RFID controller can transmit an LF interrogation signal to the RFID circuit. The RFID circuit can transmit an RF signal to the RFID controller in response to the LF receiver receiving the interrogation signal. The RF signal can include the brake pad wear data.

According to another aspect, alone or in combination with any previous aspect, the system can include a diagnostic tool operative to interrogate the RFID circuit to perform diagnostic functions on the RFID circuit.

According to another aspect, alone or in combination with any previous aspect, the LF receiver can be near field communication (NFC) enabled. The system can include an NFC enabled device operative to interrogate the RFID circuit to perform diagnostic functions on the RFID circuit.

According to another aspect, alone or in combination with any previous aspect, the system can include an initiator of a tire pressure monitoring (TPM) system. The TPM initiator can issue a LF interrogation signal to the RFID circuit. In response to receiving the LF interrogation signal, the RFID circuit can transmit the RF signal to the vehicle-based receiver.

According to another aspect, alone or in combination with any previous aspect, the vehicle-based receiver can include a passive keyless entry (PKE) controller.

According to another aspect, alone or in combination with any previous aspect, the sensor head can include a resistive break pad wear element or a capacitive brake pad wear element.

According to another aspect, alone or in combination with any previous aspect, the wear sensor can include a brake pad mounted sensor head, a sensor base unit mounted remote from the brake pad, and a cable interconnecting the sensor head and the base unit. The base unit can include an RF communication circuit for transmitting an RF signal including brake pad wear data obtained from the sensor head.

A brake pad wear sensing system for measuring brake pad wear for a vehicle disc brake system can include a brake pad wear sensor including an RFID circuit including a low frequency (LF) receiver and a radio frequency (RF) transmitter. The system can include a vehicle-based receiver including an RFID controller that issues an LF interrogation signal. The LF receiver of the RFID circuit can receive the interrogation signal. The RFID controller can respond to receiving the interrogation signal by providing an RF response signal via the RF transmitter. The RF response signal can include the brake pad wear data.

BRIEF DESCRIPTION OF THE DRAWINGS

The foregoing and other features and advantages of the present invention will become apparent to those skilled in the art to which the present invention relates upon reading the following description with reference to the accompanying drawing, in which.

DETAILED DESCRIPTION

Figure 1:
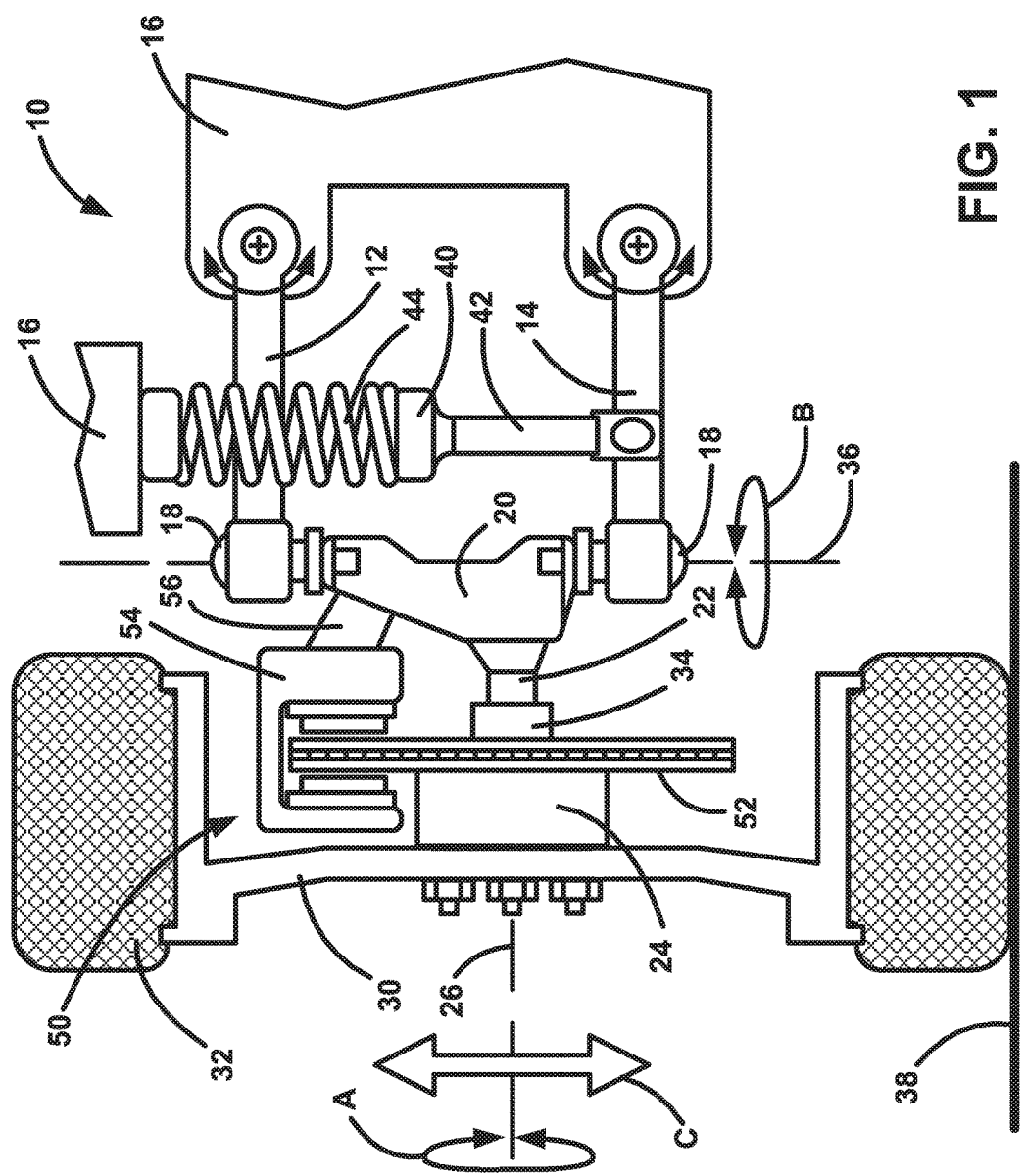
FIG. 1 is a schematic illustration of an example vehicle configuration showing disc brake components mounted on vehicle suspension components.

Referring to FIG. 1, an example vehicle suspension system 10 includes an upper control arm 12 and a lower control arm 14 that are connected to the vehicle 16 for pivoting movement. A steering knuckle 20 is connected to free ends of the control arms 12, 14 by ball joints or the like that permit relative movement between the knuckle and control arms. The steering knuckle 20 includes a spindle 22 that supports a wheel hub 24 for rotation (see arrow A) about a wheel axis 26. A wheel or rim 30 and tire 32 can be mounted on the wheel hub 24 by known means, such as lugs and lug nuts. The wheel hub 24 includes bearings 34 that facilitate rotation of the hub, rim 30, and tire 32 about the axis 26. The steering knuckle 20 is itself rotatable about a steering axis 36 (see arrow B) to steer the vehicle 16 in a known manner.

A damper 40, such as a shock absorber or strut, has a piston rod 42 connected to the lower control arm 14 and a cylinder 44 that is supported by structure of the vehicle 16, such as a vehicle frame-mounted bracket. The damper 40 dampens relative movement of the control arms 14, 16, and the steering knuckle 20 relative to the vehicle 16. The damper 40 can thus help dampen and absorb impacts between the road 38 and the tire 32, such as impacts with bumps, potholes, or road debris, that produce up and down movement (see arrow C) of the suspension system 10, the wheel 30, and the tire 32.

The vehicle 16 includes a disc braking system 50 that includes a brake disc 52 secured to the hub 24 for rotation with the hub, wheel 30, and tire 32. The disc braking system 50 also includes a brake caliper 54 that is secured to the steering knuckle 20 by a bracket 56. The disc 52 and the caliper 54 thus move in unison with the steering knuckle 20 through steering movements (arrow B) and suspension movements (arrow C). The disc 52 rotates (arrow A) relative to the caliper 54 and has an outer radial portion that passes through the caliper.

The configuration of the suspension system 10 shown in FIG. 1 is by way of example only and is not meant to limit the scope of the invention. The brake pad wear sensor system disclosed herein can be configured for utilization with any vehicle suspension configuration that implements disc brakes. For example, while the illustrated suspension system 10 is an independent front suspension, specifically an upper and lower control arm/A-arm (sometimes referred to as a double wishbone) suspension, other independent suspensions can be used. Examples of independent suspensions with which the brake pad wear sensing system can be implemented include, but are not limited to, swing axle suspensions, sliding pillar suspensions, MacPherson strut suspensions, Chapman strut suspensions, multi-link suspensions, semi-trailing arm suspensions, swinging arm suspensions, and leaf spring suspensions. Additionally, the brake pad wear sensing system can be implemented with dependent suspension systems including, but not limited to, Satchell link suspensions, Panhard rod suspensions, Watt's linkage suspensions, WOB link suspensions, Mumford linkage suspensions, and leaf spring suspensions. Furthermore, the brake pad wear sensing system can be implemented on front wheel disc brakes or rear wheel disc brakes.

Figure 2:
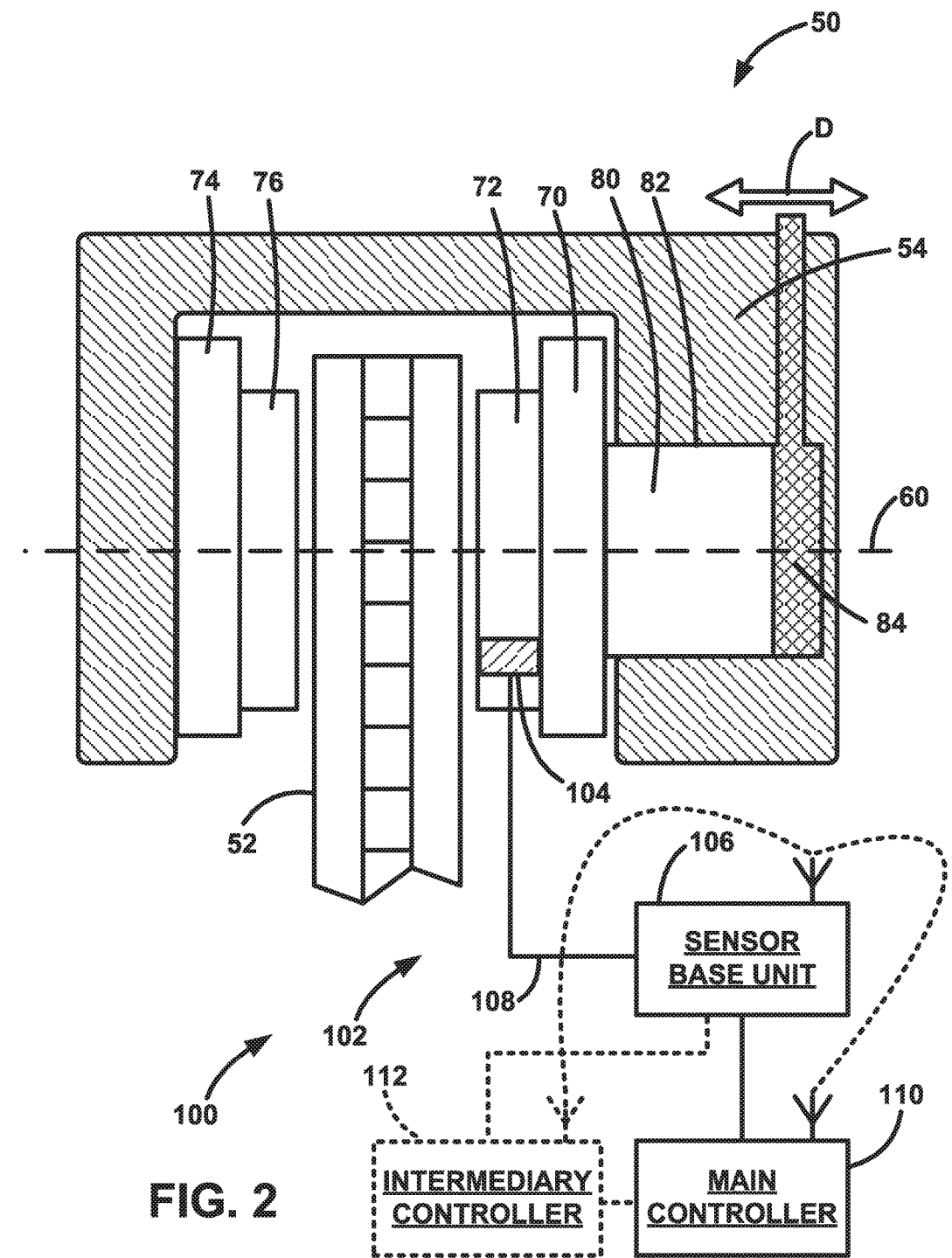
FIG. 2 is a schematic illustration depicting a brake wear sensor system implemented on an example disc brake configuration, wherein the disc brake is shown in a non-braking condition.
Figure 3:
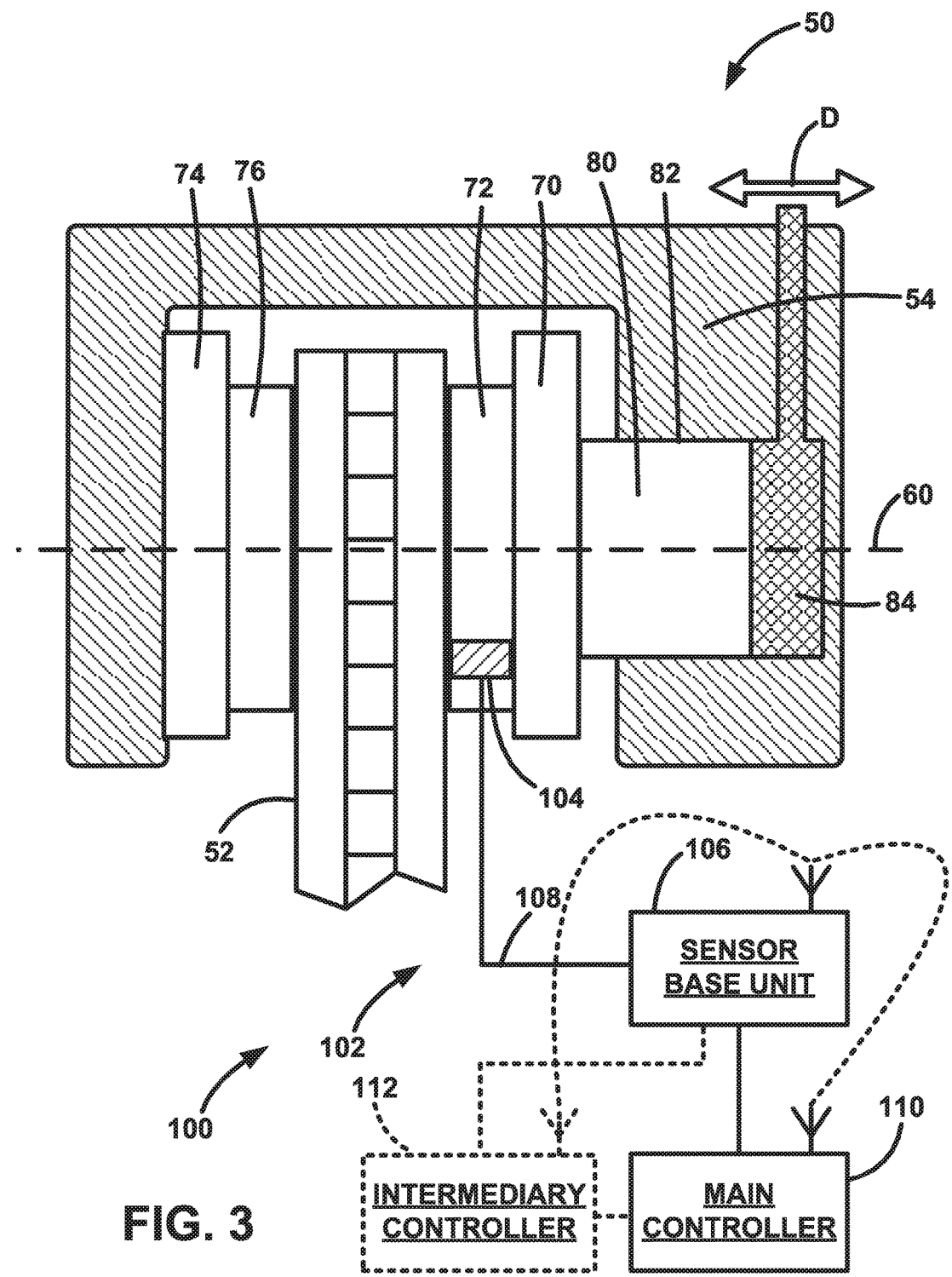
FIG. 3 is a schematic illustration depicting the brake wear sensor system of FIG. 2, wherein the disc brake is shown in a first braking condition with brake pads at a first level of wear.
Figure 4:
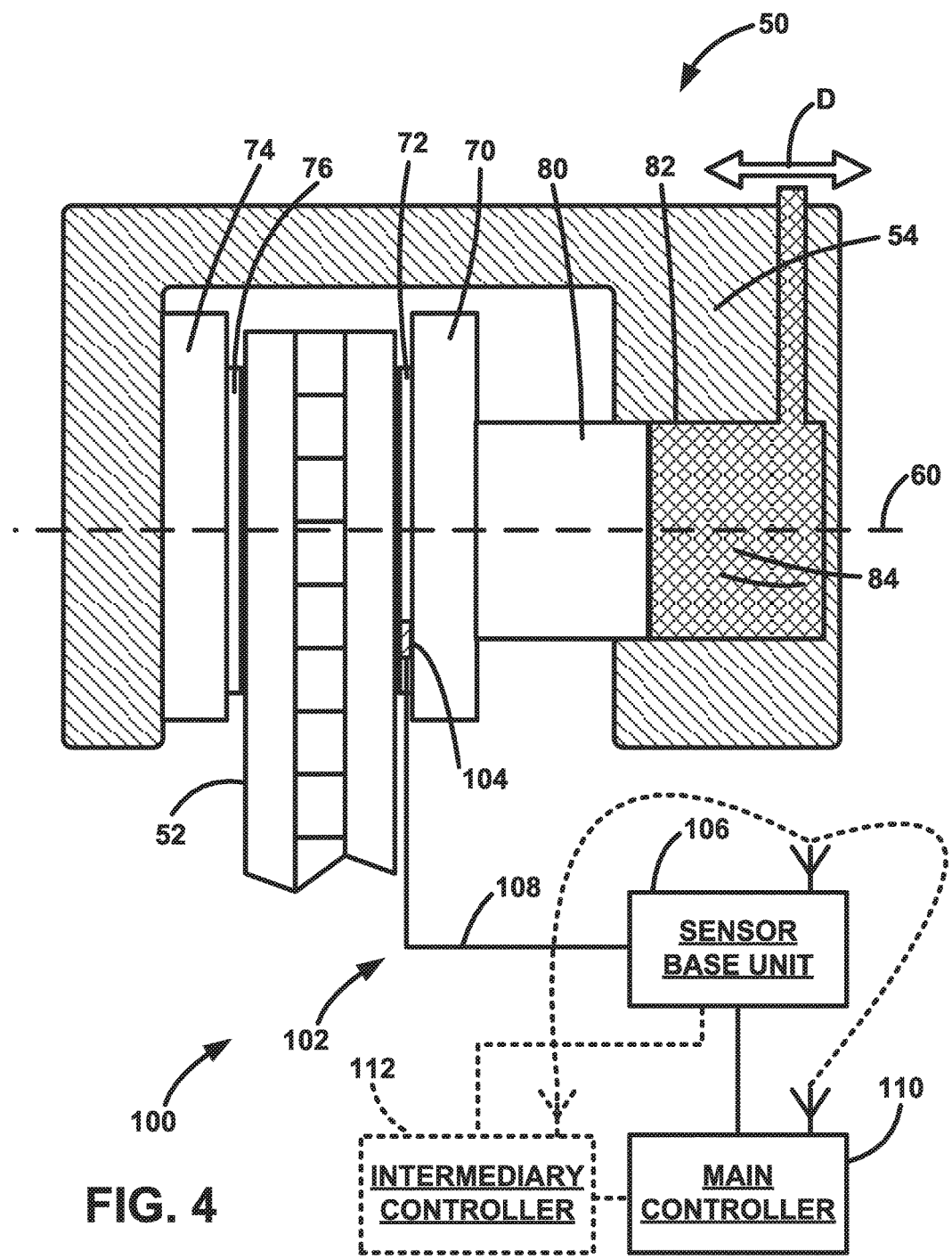
FIG. 4 is a schematic illustration depicting the brake wear sensor system of FIG. 2, wherein the disc brake is shown in a second braking condition with brake pads at a second level of wear.

Referring to FIGS. 2-4, the disc braking system 50 is illustrated schematically and in greater detail. The brake system 50 is a single piston floating caliper system in which the connection of the caliper 54 to the vehicle 16 allows for axial movement of the caliper ("float") relative to the brake disc 52. In this floating caliper configuration, the caliper 54 is permitted to move axially toward and away from the disc 52 (see arrow ID) parallel to a braking axis 60.

The brake system 50 includes an inner brake pad holder 70 that supports an inner brake pad 72, and an outer brake pad holder 74 that supports an outer brake pad 76. The inner brake pad holder 70 is supported on a piston 80. The outer brake pad holder 74 is supported on the floating caliper 54. The piston 80 is disposed in a cylinder 82 that is supported on or formed in the floating caliper 54. Brake fluid 84 is pumped into the cylinder 82 in response to driver application of a brake pedal (not shown) in order to actuate the braking system 50.

The brake system 50 is maintained in the unactuated condition of FIG. 2 via bias applied by a biasing member (not shown), such as a spring. When the brake pedal is applied, the brake fluid 84 fills the cylinder 82 and applies fluid pressure to the piston 80, urging it to move to the left, as viewed in FIGS. 2-4. This causes the inner brake pad holder 70 and pad 72 to move along the braking axis 60 toward the brake disc 52. The inner brake pad 72 engaging the disc 52 creates a reaction force that acts on the floating caliper 54, due to its supporting of the piston 80 and cylinder 82. Since the piston 80 is blocked against movement toward the disc 52 due to the engagement of the inner brake pad 72 with the disc, the brake fluid pressure in the cylinder 82 urges the floating caliper 54 to move to the right, as viewed in FIGS. 2-4. The floating caliper 54, moving to the right, causes the outer brake pad holder 74 and pad 76 to move along the braking axis 60 toward the brake disc 52. The inner pad 76 eventually engages the disc 52, which is now clamped between the inner and outer brake pads.

As the brake pads 72, 76 wear down, they become thinner. This is illustrated by comparing the brake pads 72, 76 of FIG. 3, which are fresh, thick, and unworn, to the brake pads of FIG. 4, which are old, thin, and worn-out. As seen in the comparison of FIGS. 3 and 4, owing to the floating caliper configuration of the brake system 50, both the piston 80 and the caliper 54 travel a greater distance when applying the worn pads of FIG. 4 than they do when applying the unworn pads.

A brake pad wear sensing system 100 measures the amount of wear on the brake pads 72, 76 directly via a sensor integrated within one of the pads. Wear on the pads is presumed to be even enough to allow the measurement of the wear on one pad to be indicative of the wear on both pads. Additionally, there is some built-in tolerance in the system 100 in that pads are considered worn well before they are at 100% worn.

Referring to FIGS. 2-4, the sensing system 100 includes a brake pad wear sensor 102. The wear sensor 102 includes a sensor head 104 that is local to (built into) the inner brake pad 72 and a remote sensor base unit 106. The sensor head 104 is connected to the sensor base unit 106 by a cable 108, which is built to withstand the high temperature environment of the brake system 50. The sensor head 104 is disposable with the worn pad 72. The base unit 106 and cable 108 are re-usable. The wear sensor 102 can communicate with a main controller 110, such as vehicle body control module (BCM) either wired (solid line) or wirelessly (dashed line). The communication with the main controller 110 can be direct, as shown, or indirect through an intermediary controller 112 (shown in dashed lines) that communicates with the main controller. Examples of such intermediary controllers are vehicle remote keyless entry (RKE) controllers, vehicle passive keyless entry (PKE) controllers, and vehicle tire pressure monitoring system (TPMS) controllers.

The sensor head 104 is designed to wear away along with the brake pad. This wearing away of the sensor head can be associated with brake pad wear by a sensor controller, which can be built into the sensor base unit 106. In this case, the sensor base unit 106 can calculate brake pad wear and transmit that information to the main controller 110, as described above. Alternatively, the base unit 106 can transmit brake pad wear data obtained via the sensor head 104 to the main controller 110 (or the intermediary controller, whichever the case may be), and that controller can determine brake pad wear based on the wear data.

Figure 5:
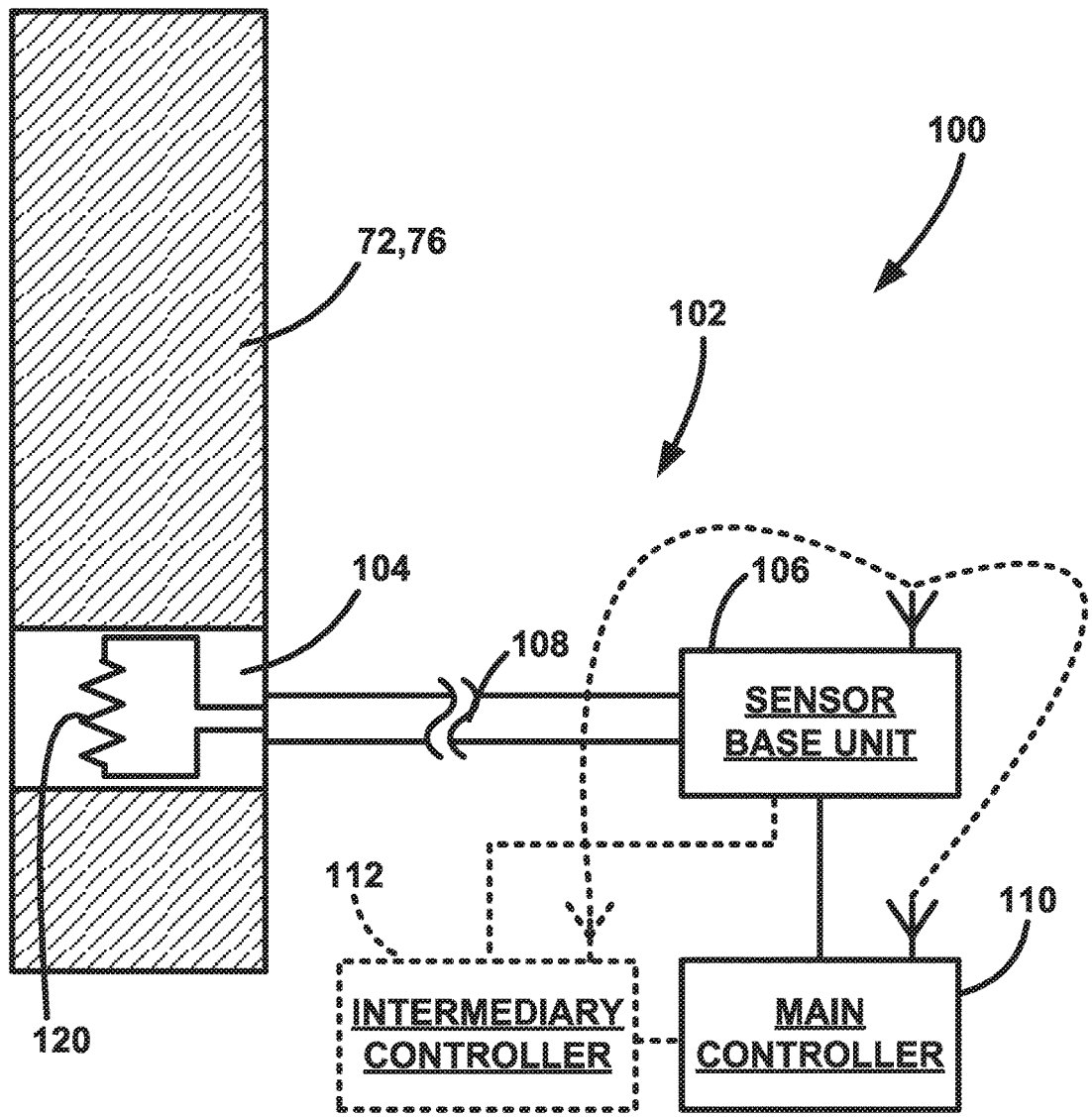
FIGS. 5 and 6 are schematic illustrations depicting different configuration of the brake wear sensor system.
Figure 6:
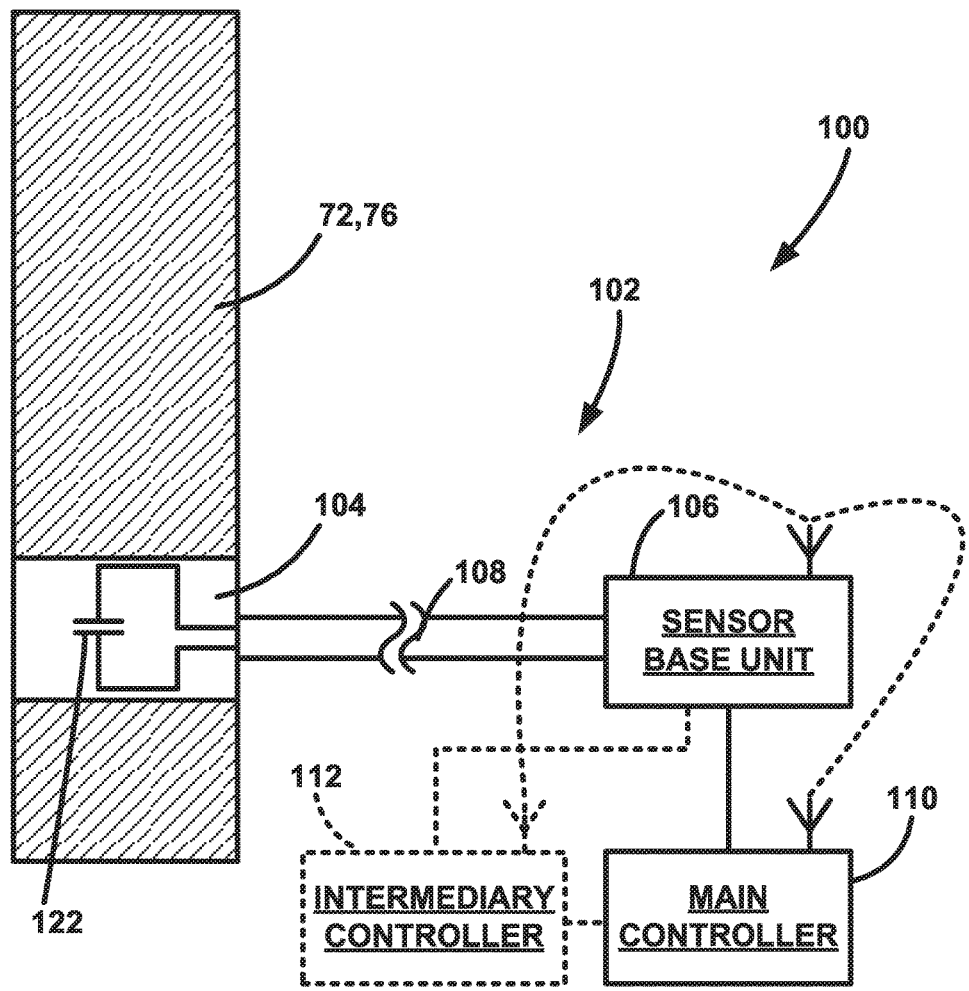

The sensor head 104 can have a variety of constructions. For example, referring to FIG. 5, the sensor head 104 is a resistive sensor in which the head forms a resistive element, indicated schematically at 120. As the pad wears, the resistance/impedance of the element 120 changes. The sensor base unit 106 senses this change in resistance/impedance and it is that data that is used to determine brake pad wear. Referring to FIG. 6, the sensor head 104 is a capacitive sensor in which the head forms a capacitor element, indicated schematically at 122. As the pad wears, the capacitance of the element 122 changes. The sensor base unit 106 senses this change in capacitance and it is that data that is used to determine brake pad wear. It should be noted here that a capacitive sensor head can also be used to measure inductance, which will also vary according to sensor wear and therefore be used to determine brake pad wear.

Utilizing Existing Vehicle RKE, PKE, and TPM Systems

Figure 7:
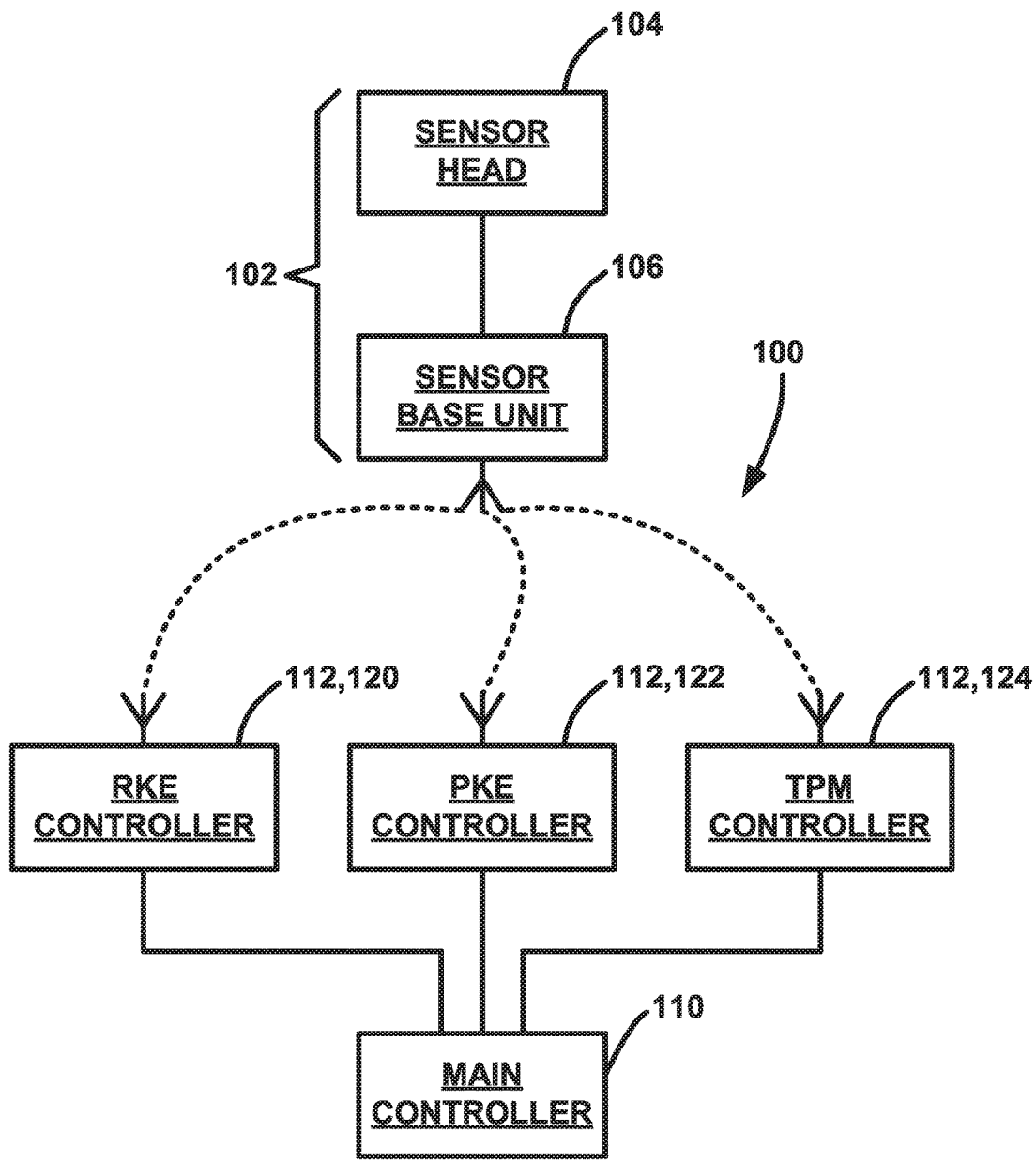
FIG. 7 is a schematic illustration depicting alternative configurations of the brake wear sensor system.

In one example configuration, the brake pad wear sensing system 100 can utilize a radio frequency (RF) transmitter operating at the same frequency used in RKE, TPM, and PKE systems in the vehicle. In this configuration, the communication will be wireless, as indicated by dashed lines in FIGS. 2-6, and the communication will be between the sensor base unit 106 and the intermediary controller 112, which communicates with the main controller 110. In this example configuration, utilizing the existing RKE/PKE/TPM system in the vehicle is simple and cost effective since almost every vehicle has at least one of these systems. Accordingly, FIG. 7 illustrates these intermediary controllers 112 as the RKE controller 120, the PKE controller 122, or the TPM controller 124. The three intermediary controllers 120, 122, 124 illustrated in FIG. 7 are shown together as alternative implementations. In other words, the brake sensor system 100 requires communication via only one of these three intermediary controllers.

In the implementations illustrated in FIG. 7, the signal produced by the sensor head 104 via interrogation by the base unit 106 varies with brake pad wear. The wear sensor 102 transmits this brake pad wear data wirelessly via RF communications to the intermediary controller 112, whichever one is selected—the RKE controller 120, the PKE controller 122, or the TPM controller 124. The intermediary controller 112 receives the brake pad wear data and can process that data to determine brake pad wear information, which it sends to the main controller 110. Alternatively, the intermediary controller 112, can transmit the brake pad wear data to the main controller 110, which can process the data itself.

TPM System Implementations

The TPM implementation can be achieved in a variety of manners. For example, the sensor base unit 106 can communicate wirelessly with the vehicle-based TPM controller 124, which also receives the wireless signals from the individual tire-mounted sensors mounted in the tires, as described above and shown in FIG. 7. As another example, referring to FIG. 8, the sensor head 104 is wired to the sensor base unit 106, which can communicate wirelessly with the tire mounted TPM pressure sensor 126, which communicates wirelessly with the TPM controller 124, which communicates with the main controller 110.

Figure 8:
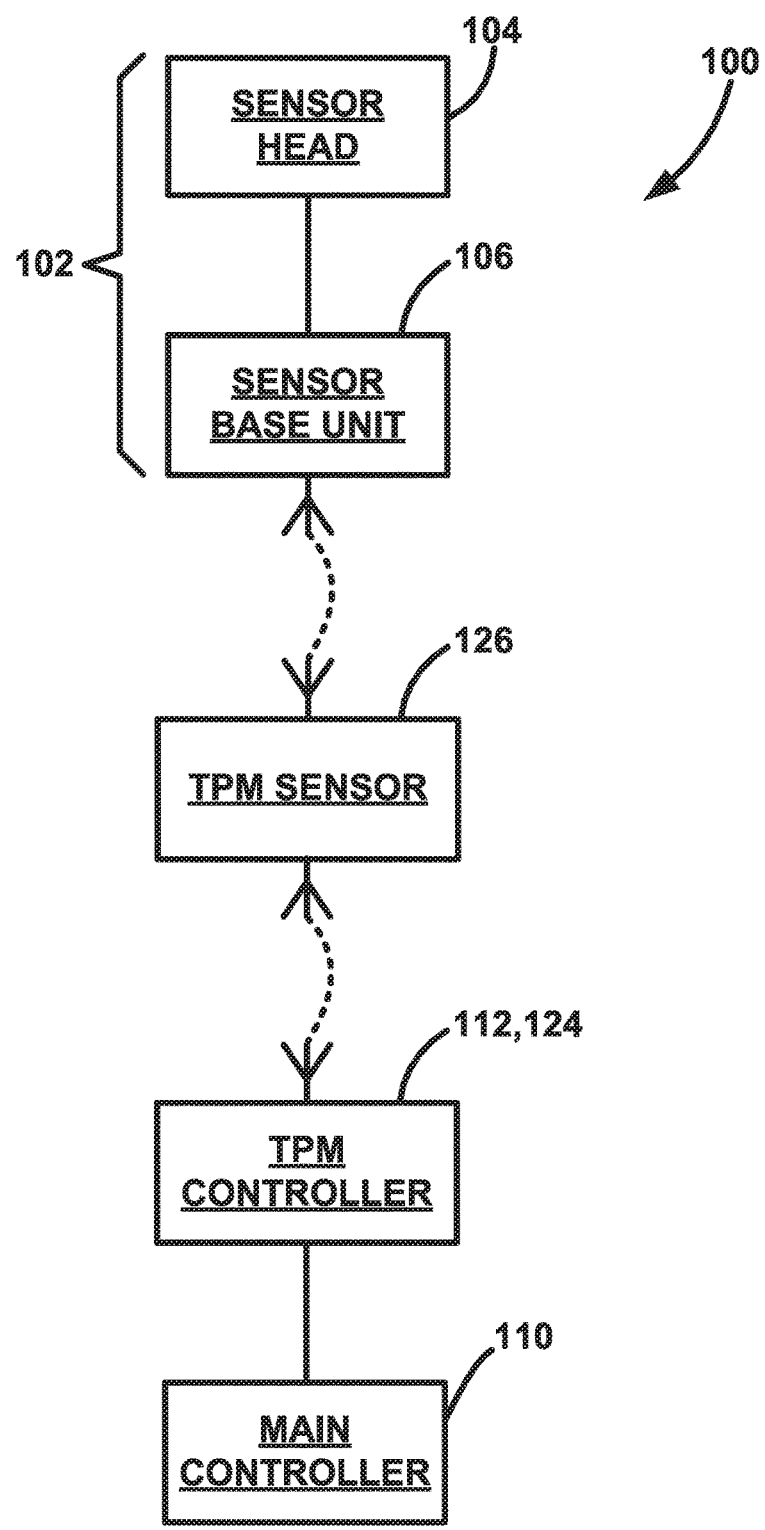
FIG. 8 is a schematic illustration depicting one particular configuration of the brake wear sensor system.

In the example configuration of FIG. 8, the TPM sensor 126 and controller 124 communicate via a low frequency, typically 125 KHz. The sensor base unit 106 includes a transmitter that transmits the brake wear data at this 125 KHz frequency to the LF receiver residing inside the TPM sensor 126 located in the tire nearby. The TPM sensor 126 typically includes an LF receiver operating around 125 KHz and an RF transmitter operating between around 315 MHz and 434 MHz. The TPM sensor 126 receives the brake pad information through LF communication from the wear sensor 102, and transmits the brake pad information via RF to the TPM controller 124 located inside the vehicle. The TPM controller 124 can relay the information to vehicle main controller 110.

This example configuration illustrated in FIG. 8, using LF communication, can be advantageous for several reasons. First, typical LF circuits are comparatively inexpensive. Additionally, utilizing the TPM sensor adds a wheel/tire position identification feature. In some TPM systems, the sensor locations are identified by the TPM system. In this case, based on TPM sensor ID and its location, the system can identify the brake pad location. Alternatively, the brake pad LF transmitter location could be identified at initial installation time and the system can use the brake pad location information to identify the TPM sensor location through LF communication in the application where the TPM sensor locations are not identified or enhance the TPM sensor location information even with the TPM system which already has TPM sensor auto-location method. Finally, through the LF communications, the wear sensor 102 can be programmed, for example, with firmware updates, and can also be subjected to diagnostic evaluations.

RFID Implementation

Figure 9:
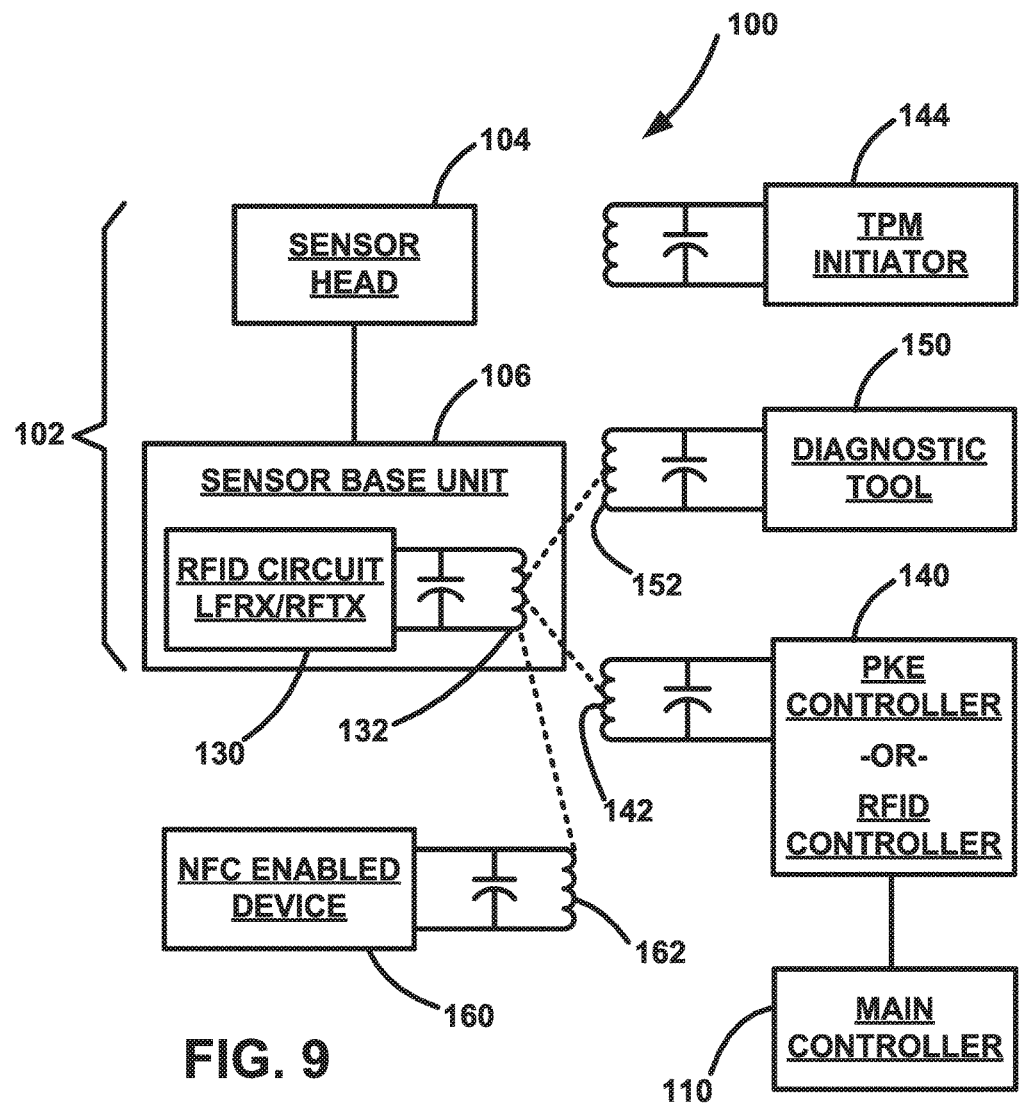
FIG. 9 is a schematic illustration depicting another particular configuration of the brake wear sensor system.

Referring to FIG. 9, an RFID implementation of the brake pad wear system 100 implements RFID technology in a manner similar to that used in vehicle passive keyless entry ("PKE") systems. Like the PKE systems, the RFID implementation of the brake pad wear system 100 implements a low frequency (LF) channel (e.g., 125 KHz) and a radio frequency (RF) channel (e.g., 315 MHz or 434 MHz).

In the PKE system, there are a few LF transmission antennas located close to the door handle and a RF receiver inside the vehicle. Once the driver with the PKE fob in his pocket touches the door handle, an LF transmitter inside the vehicle will send a LF transmission. The PKE fob inside the driver's pocket has a LF receiver. The PKE fob LF receiver receives the LF transmission from the vehicle and it will respond with an RF transmission back to the vehicle. In response to this, the PKE system unlocks the doors.

The RFID implementation of the brake pad wear system 100 can work in conjunction with the PKE system. A PKE controller issues an LF interrogation signal, which is received by the LF receiver in an RFID brake pad wear sensor. The RFD brake pad wear sensor responds to this LF interrogation signal by issuing an RF transmission back, including brake pad wear data, to the PKE controller. The PKE controller relays the brake pad wear data back to the main controller. Additionally, an RFID brake pad sensor can be without a battery, and the PKE controller can charge/interrogate the RFID brake sensor and then read the information from it. Alternatively, in vehicles not equipped with a PKE system, the brake pad wear system 100 can include a dedicated, vehicle based RFID controller.

Referring to FIG. 9, in the RFID implementation, the wear sensor 102 is outfitted with an RFID circuit 130, for example, in the sensor base unit 106. The RFID circuit can communicate with the PKE controller 140 in the vehicle. The RFID circuit 130 can have a LF receiver (LFRX) circuit and a RF transmitter (RFTX) circuit that transmit and receive via an antenna coil 132. The RFID circuit 130 can operate under the same principles used by the fob in the PKE system. The RFID circuit 130 can be just a simple RFID circuit, with the LFRX circuit operating at 125 KHz and the RFTX circuit operating at 315 MHz or 434 MHz, both of which are typical for PKE systems. The RFID circuit 130 can be a passive device powered via the PKE controller 140, or it can include a battery to increase the operating range. A battery powered RFID circuit 130 can be beneficial, for example, where there is a large distance between the PKE antenna 142 and the RFID circuit antenna 132.

In operation, the PKE controller 140 can issue an LF interrogation signal via PKE antenna 142. The RFID circuit receives the LF interrogation signal via RFID antenna coil 132, which causes the RFID circuit to transmit an RF signal including the brake pad wear data obtained from the sensor head 104. This RF transmission is transmitted via the RFID antenna 132. The PKE controller 140 receives the RF signal via the PKE antenna 142, and either processes the brake pad wear data itself or passes the data along to the main controller 110 for processing.

Some vehicles include TPM systems include a TPM initiator 144 including an LF coil located in each wheel well. These TPM initiators 144 are used to issue an LF signal that initiates an auto-locator feature in which the TPM sensors are associated with wheel positions on the vehicle. On vehicles equipped with this feature, the wheel well-mounted LF transmitters can be used to also initiate interrogation of the RFID brake pad wear sensor 102. This can be advantageous in that it avoids the need to position the antenna 142 for LF communication with the RFID antenna 132. Once interrogated by the TPM initiator 144, the RFID circuit 130 can respond via RFTX to the PKE controller 140 with the brake pad wear data.

As another alternative, as shown in FIG. 9, a near field communication (NFC) enabled device 160 can communicate with an RFID brake pad wear sensor. Most cell phones, and some similar devices, such as tablet computers, have embedded NFC capabilities. In this instance, the user can be periodically reminded by the vehicle management system, e.g., via Bluetooth or the other means, to check the brake pad life. The RFID brake pad wear sensor can be setup to include an NFC circuit. The user can place the antenna 162 of the NFC enabled device 160 near the RFID, NFC equipped brake pad sensor. The brake pad information can be reported to the cell phone through NFC communication and then the information is relayed to the vehicle.

Those skilled in the art will appreciate that vehicles may not be equipped with a PKE system. In this instance, as shown in FIG. 9, the controller 140 and antenna 142 can be those of a dedicated RFID controller, which operates under identical principles as those discussed above regarding the PKE system, but which is dedicated to the brake pad wear sensing functions described herein. This implementation can be advantageous because it can take into consideration placement of the antenna(s) 142 in order to optimize the communication with the RFID circuit 130. Additionally and/or alternatively, this implementation can also take advantage of the TPM initiator 144, if available.

As shown in FIG. 9, the RFID controller 140 can communicate with and provide brake pad wear data to the main controller 110. Additionally, the dedicated RFID controller 140 can allow for onboard processing of the brake pad wear data received from the sensor 102. Instead of sending raw data to the main controller 110 for processing to determine brake pad wear information, the dedicated RFID controller 140 can perform this processing and provide the brake pad wear information to the main controller.

Additionally, the RFID circuit implementation allows for diagnostic testing, data acquisition, and firmware updates via a diagnostic tool 150 that communicates with the RFID circuit 130 via an LF antenna 152. These diagnostic tools can be the same tool used by technicians to test, troubleshoot, and update TPM system sensors.

From the above description of the invention, those skilled in the art will perceive improvements, changes and modifications. Such improvements, changes and modifications within the skill of the art are intended to be covered by the appended claims.

We claim:

1. A brake pad wear sensing system for measuring brake pad wear for a vehicle disc brake system, the brake pad wear measuring system comprising:
a brake pad wear sensor comprising an RF communication circuit for transmitting an RF signal including brake pad wear data; and
a vehicle-based receiver comprising an RF communication circuit for receiving the brake pad wear data in the RF signal transmitted by the wear sensor, wherein the vehicle-based receiver is operatively connected to a vehicle-based main controller, the vehicle-based receiver transmitting the brake pad wear data to the main controller wherein the wear sensor comprises an RFID circuit and the vehicle-based receiver comprises an RFID controller, and the wear sensor comprises a low frequency (LF) receiver, wherein the RFID controller transmits an LF interrogation signal to the RFID circuit, and the RFID circuit transmits an RF signal to the RFID controller in response to the LF receiver receiving the interrogation signal, the RF signal comprising the brake pad wear data.

2. The brake pad wear sensing system recited in claim 1, wherein the vehicle-based main controller comprises one of a remote keyless entry (RKE) system controller, a passive keyless entry (PKE) system controller, and a tire pressure monitoring (TPM) system controller.

3. The brake pad wear sensing system recited in claim 1, wherein the vehicle-based receiver comprises a tire pressure monitoring (TPM) system controller, and wherein a base unit transmits the RF signal to a tire-mounted TPM sensor, which transmits a signal including the brake pad wear data to the main controller.

4. A brake pad wear sensing system for measuring brake pad wear for a vehicle disc brake system, the brake pad wear measuring system comprising:
a brake pad wear sensor comprising an RF communication circuit for transmitting an RF signal including brake pad wear data; and
a vehicle-based receiver comprising an RF communication circuit for receiving the brake pad wear data in the RF signal transmitted by the wear sensor, wherein the vehicle-based receiver is operatively connected to a vehicle-based main controller, the vehicle-based receiver transmitting the brake pad wear data to the main controller wherein the wear sensor comprises an RFID circuit and the vehicle-based receiver comprises an RFID controller, wherein the RFID controller comprises a passive keyless entry (PKE) controller that issues a low frequency (LF) interrogation signal to the RFID circuit, the RFID circuit transmitting a radio frequency (RF) signal to the PKE controller, the RF signal comprising the brake pad wear data.

5. The brake pad wear sensing system recited in claim 4, further comprising a diagnostic tool operative to interrogate the RFID circuit to perform diagnostic functions on the RFID circuit.

6. The brake pad wear sensing system recited in claim 1, further comprising a diagnostic tool operative to interrogate the RFID circuit to perform diagnostic functions on the RFID circuit.

7. The brake pad wear sensing system recited in claim 1, wherein the LF receiver is near field communication (NFC) enabled, the system further comprising an NFC enabled device operative to interrogate the RFID circuit to perform diagnostic functions on the RFID circuit.

8. The brake pad wear sensing system recited in claim 1, further comprising an initiator of a tire pressure monitoring (TPM) system, the TPM initiator issuing a LF interrogation signal to the RFID circuit, wherein in response to receiving the LF interrogation signal, the RFID circuit transmits the RF signal to the vehicle-based receiver.

9. The brake pad wear sensing system recited in claim 8, wherein the vehicle-based receiver comprises a passive keyless entry (PKE) controller.

10. The brake pad wear sensing system recited in claim 1, wherein the sensor head comprises a resistive brake pad wear element or a capacitive brake pad wear element.

11. A brake pad wear sensing system for measuring brake pad wear for a vehicle disc brake system, the brake pad wear measuring system comprising:
a brake pad wear sensor comprising an RF communication circuit for transmitting an RF signal including brake pad wear data; and
a vehicle-based receiver comprising an RF communication circuit for receiving the brake pad wear data in the RF signal transmitted by the wear sensor, wherein the vehicle-based receiver is operatively connected to a vehicle-based main controller, the vehicle-based receiver transmitting the brake pad wear data to the main controller, wherein the wear sensor comprises a brake pad mounted sensor head, a sensor base unit mounted remote from the brake pad, and a cable interconnecting the sensor head and the base unit, wherein the base unit comprises an RF communication circuit for transmitting an RF signal including brake pad wear data obtained from the sensor head.

12. A brake pad wear sensing system for measuring brake pad wear for a vehicle disc brake system, the brake pad wear measuring system comprising:
a brake pad wear sensor comprising an RFID circuit comprising a low frequency (LF) receiver and a radio frequency (RF) transmitter; and
a vehicle-based receiver comprising an RFID controller that issues an LF interrogation signal, the LF receiver of the RFID circuit receiving the interrogation signal, the RFID controller responding to receiving the interrogation signal by providing an RF response signal via the RF transmitter, the RF response signal comprising the brake pad wear data.

* * * * *